C. E. GLENN.
IRRIGATION DITCH GUARD.
APPLICATION FILED MAR. 1, 1916.
1,213,624.
Patented Jan. 23, 1917.
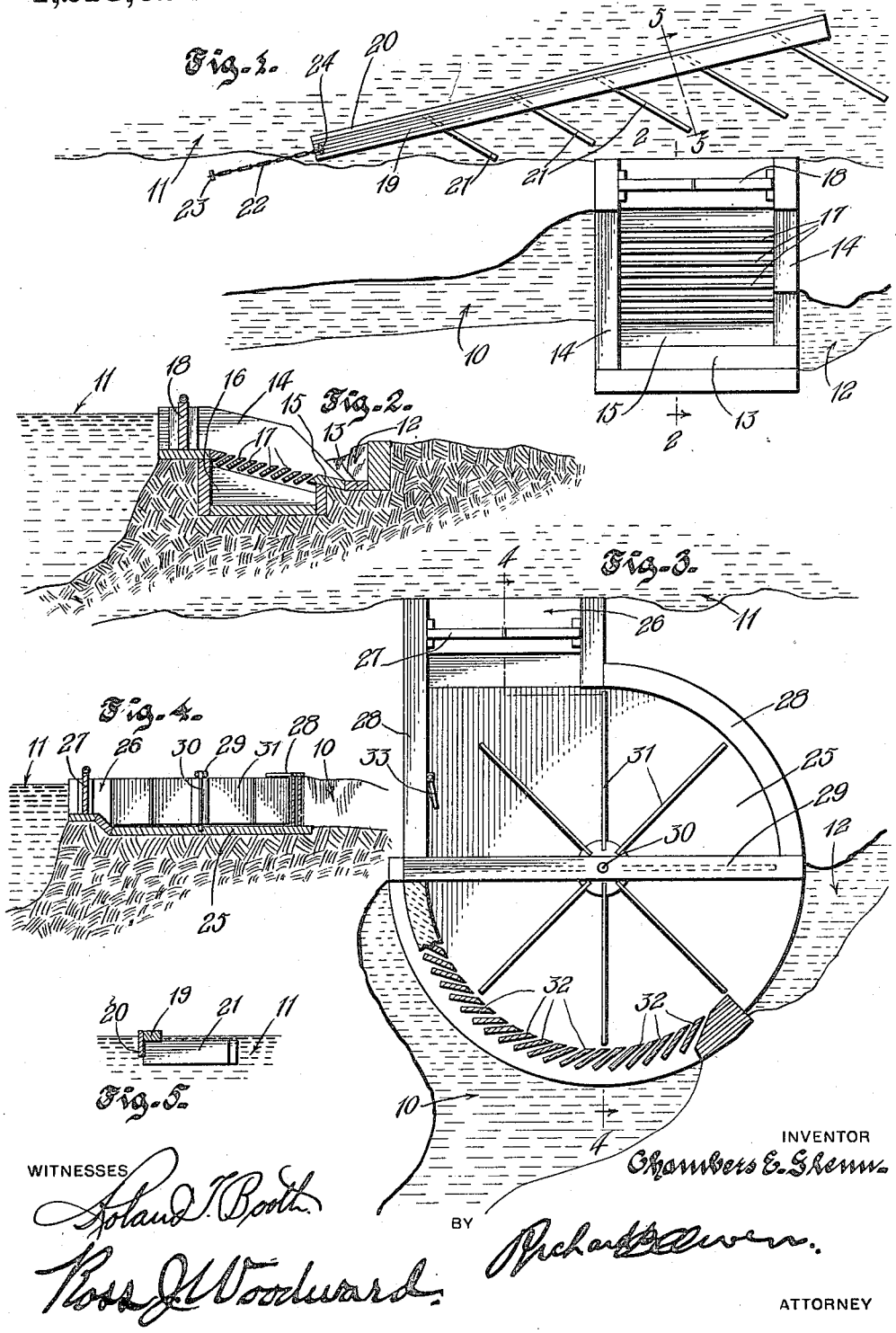
WITNESSES
INVENTOR
BY
ATTORNEY

UNITED STATES PATENT OFFICE.

CHAMBERS E. GLENN, OF TERRA ALTA, WEST VIRGINIA.

IRRIGATION-DITCH GUARD.

1,213,624. Specification of Letters Patent. Patented Jan. 23, 1917.

Application filed March 1, 1916. Serial No. 81,504.

*To all whom it may concern:*

Be it known that I, CHAMBERS E. GLENN, a citizen of the United States, residing at Terra Alta, in the county of Preston and State of West Virginia, have invented certain new and useful Improvements in Irrigation-Ditch Guards, of which the following is a specification.

This invention relates to an improved irrigation ditch guard and the principal object of the invention is to provide a guard for keeping fish out of an irrigating ditch, the guard being so constructed that water will be permitted to freely pass into the ditch but small fish as well as large ones kept out of the ditch and to further so construct this guard that drift in the river will be kept away from the guard thus preventing the guard from being injured by the drift.

Another object of the invention is to provide an improved type of screen for keeping the fish out of the ditch, this screen being placed in an improved type of run-way for returning fish and waste water to the river.

Another object of the invention is to provide an improved type of paddle wheel and mounting, the paddle wheel serving to sweep the fish into the ditch leading back into the river.

This invention is illustrated in the accompanying drawings, wherein:—Figure 1 is a top plan view showing one form of the fish guard. Fig. 2 is a sectional view taken along the line 2—2 of Fig. 1. Fig. 3 is a view of a modified form of guard, the view being shown principally in top plan and partially in section. Fig. 4 is a sectional view taken along the line 4—4 of Fig. 3. Fig. 5 is a sectional view taken along the line 5—5 of Fig. 1.

This device is to prevent fish and especially small fish from entering the irrigating ditch 10 through which water is drawn from the river 11 for irrigating purposes and is so positioned that it will communicate with the river 11, irrigating ditch 10 and spillway or return ditch 12 leading back to the river. In Figs. 1 and 2 there has been shown one form of guard and in Figs. 3 and 4 there has been shown a modified form.

In the form shown in Figs. 1 and 2 there is provided a trough 13 having side walls 14 and a bottom 15, one portion of which is cut away to provide a passage-way through which the water may pass into the spout 16 communicating with the irrigating ditch 10. This passage-way is filled with slats 17 which extend as shown in Fig. 2 and form baffles, the upper edges of which are beveled so that the fish will move easily across these plates instead of passing down between the same. The water passes into this trough through the gate-way, the passage of the water being controlled by the removable gate 18, and as the bottom 15 of the trough is pitched at an incline, the water will move rapidly down the trough thus causing the fish to move rapidly over the baffle plates. A sufficient amount of water will pass through these baffle plates into the irrigating ditch 10 and the remainder will pass into the spill-way or return ditch 12 through which it will pass back into the river thus carrying the fish to the river.

In order to keep drift away from the gate-way there has been provided the sweep 19. This sweep 19 is formed of wood or some other material which will float and is provided with a side bar 20 and fins 21, the fins being secured to the under face of the sweep 19 and inner face of the side bar 20. The fins increase in length toward the free end of the sweep so that the fins would retain the sweep at the proper angle even if all of the fins engage the bank of the river instead of only the first one as shown in the drawing. These fins are preferably formed of wood or some other material which will have sufficient give to provide resiliency so that if a large log should strike the sweep the fins would take up the force of the blow and would then swing the sweep outwardly thus taking up the force of the blow and returning the log to a position toward the center of the stream. In order to permit free play for the sweep, there has been provided a tie-chain 22 which is connected with an anchor pin 23 on the shore and is connected with the eye 24 secured in the sweep 19. In the drawings this sweep has only been shown in connection with Fig. 1 but it is understood that this sweep can be used in connection with the guard shown in Figs. 3 and 4 as well as with the type of guard shown in Figs. 1 and 2.

The trough 25 in Fig. 3 is provided with a gate-way 26 in which there is mounted a gate 27 similar to the gate 18 so that the flow of water from the river into this trough can be regulated. This trough is positioned as shown in Fig. 3 for communication with the irrigating ditch and spill-way or return ditch and is provided with side walls 28 upon which there is secured the cross bar 29 providing a bearing for the pivot pin or shaft 30 of the paddle wheel 31. This paddle wheel rotates in the trough as the water passes through the same and will serve to drive the fish through the trough and into the spill-way. One of the walls of this trough is cut away to provide an outlet communicating with the irrigating ditch, the outlet being protected by means of baffle plates 32 similar to the baffle plates 17 positioned in the outlet of the trough of Figs. 1 and 2. The action of this guard is very similar to the action of the form shown in Figs. 1 and 2, the baffle plates being so positioned that the flow of water would tend to sweep the fish past the inner ends of the plates and the blades of the paddle wheel serving to assist this action. In order to prevent danger of the paddle wheel being stopped in its rotation by small drift which may have passed over the sweep 19, there is provided a spring 33 positioned to engage any drift which might attempt to pass along the trough and jam the paddle wheel. This spring will throw the drift back out of the way to a position in which it will pass down the river. It will thus be seen that the action of these two forms of guards is similar although the guard shown in Figs. 3 and 4 is provided with a modified construction.

What is claimed is:—

1. A fish guard comprising a substantially circular body having an upstanding wall and having an inlet and a spill-way outlet, the wall being provided with an opening intermediate the inlet and spillway outlet, baffle plates positioned in the wall openings and having their inner ends conforming to the contour of the wall, and a paddle wheel rotatably mounted in the circular body and having its paddles extending in operative relation to the inlet and outlet and openings in the upstanding wall.

2. A fish guard including a floating brush sweep comprising a carrying bar, a cable for loosely connecting one end of the bar with the bank of a stream when the bar is floating in the stream, and inclined fins extending from said bar and extending transversely thereof beyond one side of the bar and increasing in length toward the free end thereof, the fins being positioned between the bar and the bank of the stream.

In testimony whereof I affix my signature in presence of two witnesses.

CHAMBERS E. GLENN.

Witnesses:
E. T. CHRYSTAL,
H. F. GLENN.

Copies of this patent may be obtained for five cents each, by addressing the "Commissioner of Patents, Washington, D. C."